United States Patent
Fredericks

[15] 3,652,035
[45] Mar. 28, 1972

[54] CHANNEL TAIL AIRCRAFT

[72] Inventor: Charles G. Fredericks, 1411 Pennsylvania Avenue, N.W., Silver Spring, Md. 20004

[22] Filed: June 12, 1969

[21] Appl. No.: 832,768

[52] U.S. Cl................................244/12 CW, 244/36, 244/54
[51] Int. Cl...........................................................B64d 27/00
[58] Field of Search............................244/12, 13, 55, 54, 36

[56] References Cited

UNITED STATES PATENTS

| | | | |
|---|---|---|---|
| 2,424,556 | 7/1947 | Custer | 244/13 |
| 2,469,619 | 5/1949 | Warner | 244/12 X |
| 2,472,763 | 6/1949 | Rodeck | 244/13 |
| 3,017,139 | 1/1962 | Binder | 244/12 |
| 3,215,367 | 11/1965 | Schott | 244/13 |
| 3,322,223 | 5/1967 | Bertelsen | 244/12 X |
| 2,194,596 | 3/1940 | Henter | 244/13 |
| 2,937,823 | 5/1960 | Fletcher | 244/12 |
| 3,285,538 | 11/1966 | Burnelli | 244/36 |

Primary Examiner—Milton Buchler
Assistant Examiner—Steven W. Weinrieb
Attorney—Littlepage, Quaintance, Wray & Aisenberg

[57] ABSTRACT

A twin boom lifting body fuselage aircraft has a twin tail assembly with a single horizontal stabilizer. A downward semicircular channel is formed in the center of the horizontal stabilizer, and an engine is mounted in the channel, with a propeller immediately adjacent a forward edge of the channel. The propeller draws air from the upper surface of the lifting fuselage and pushes the air rapidly through the channel, thereby increasing lift of the fuselage and of the horizontal stabilizer.

6 Claims, 3 Drawing Figures

PATENTED MAR 28 1972  3,652,035

INVENTOR
CHARLES G. FREDERICKS

BY James C. Wray
ATTORNEYS

CHANNEL TAIL AIRCRAFT

BACKGROUND OF THE INVENTION

Short takeoff and landing aircraft are receiving more attention as demand for rapid short and medium range intercity travel increases. At the time of this invention, two types of airports are developing. Long runway airports are being planned at distances from cities which they serve for economy of space and for noise abatement. Short landing strips are being provided in or immediately adjacent city centers to facilitate short range aircraft which have short takeoff and landing attributes.

Much work is now being done on designing high-lift and high-load aircraft for lifting as many passengers as possible with short take-off and landing runs.

SUMMARY OF THE INVENTION

The present invention provides an aircraft having a high-load high-lift fuselage with an auxiliary engine and propulsion means to increase airflow over an upper surface of the lifting body and to increase at the same time the lift of the empennage or tail section.

The aircraft used in a preferred embodiment of the present invention has a rectangular planform lifting body which has a chord greater than its height, and which has a length greater than the chord. Air dividing at the leading edge of the lifting body and flowing over the upper and lower surfaces of the body with a greater velocity on the upper surface provides lift to the craft. Modified eliptical planform wings are provided extending outwardly from the lifting body fuselage. In the preferred embodiment of the invention twin booms which form part of the fuselage extend rearwardly and upwardly from the main lifting body portion of the fuselage. An empennage in the form of a single horizontal stabilizer spans the twin booms and twin vertical stabilizers, commonly referred to as a double tail, which extend upward from lateral extremities of the horizontal stabilizer. As is conventional, the horizontal stabilizer is provided with an elevator, and the vertical stabilizers are provided with hinged rudders for controlling respectively the angle of tack of the aircraft and the yaw. Trim tabs are provided on the control surfaces as is conventional.

The remaining control surfaces of the aircraft are the ailerons which control roll. Nose slats may be provided on the lifting body fuselage, as described in copending application Ser. No. 805,185, filed Mar. 7, 1969, by Charles G. Fredericks.

A preferred embodiment of the propulsion system is trimotor configuration in which two propeller-driving turbine engines are mounted forwardly on lateral extremities of the lifting body fuselage. A third engine is mounted within a channel in the horizontal stabilizer, and besides driving the plane forward, the third engine further enhances the lift of the fuselage lifting body and of the horizontal fin. The propeller of the third engine is preferably located very close to the leading edge of the semicircular channel in the horizontal fin. Air to feed the third propeller is drawn from the upper surface of the lifting body, where the increased velocity provides additional lift to the body. The prop wash is channeled through the channel section of the horizontal fin, providing highly enhanced lift to the horizontal fin. The resultant effect of the third engine, besides providing increased cruising speed and increased acceleration upon takeoff, is that the third engine provides greatly increased lift due to the effect of the propeller intake and prop wash speeding air over upper lifting surfaces of the tail and fuselage.

Preferably, the landing gear comprises four double wheeled elements, one at each corner of the rectangular planform lifting body. The rear gear have fixed axes, and the front gear are rotatable, as is conventional in tricycle landing gear.

Although the channel tail has been described by specific reference to its use with a lifting body fuselage aircraft, increased efficiency of conventional aircraft is produced by adding the lifting channel tail. Unusual effects of an enchanced fuselage lift are provided by the channel tail described herein when the channel tail is combined with the latter type of aircraft. Although the channel tail may be provided at a level of the lifting body, the improved lifting effects are enhanced by raising the channel tail and the third propeller so that air is primarily drawn from the upper surface of the lifting body. The raising of the channel tail has the further effect of providing easy access to the clam-shell door in the trailing edge of the lifting body.

While a rectangular planform lifting body has been disclosed, the novel apparatus described herein has applications with all forms of lifting bodies, such as triangular planform and eliptical planform bodies. By appropriate balancing and wing positioning, the tail mounted channel and engine are useful in single engine aircraft as well as in multiple engine aircraft. One or more channel mounted engines may be employed in the tail assembly. While turbo-prop engines are especially useful in STOL aircraft, the invention has useful application with reaction type or jet type propulsion means. The primary considerations which are necessary in the employment of the invention are the positioning of the propulsion means in such a manner as to enhance the flow of air over the main lifting air foil sections and through the channel.

DETAILED DESCRIPTION OF THE DRAWINGS

Figure 2:
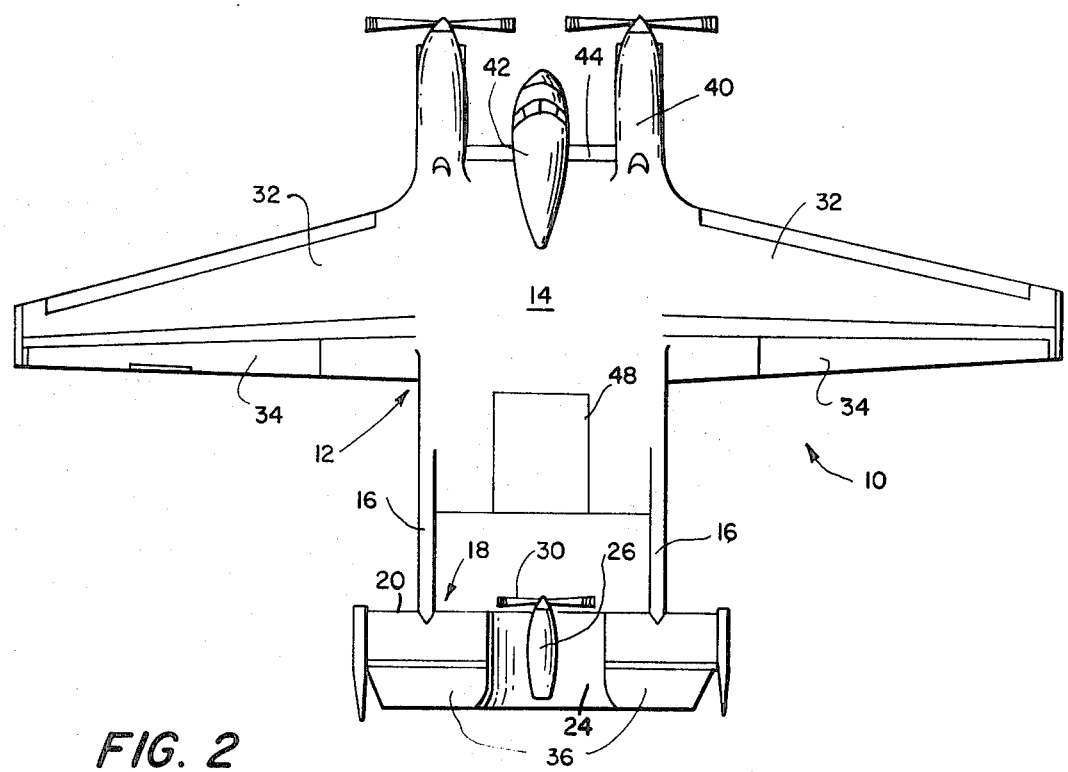
FIG. 2 is a plan view of the aircraft of FIG. 1.
Figure 3:
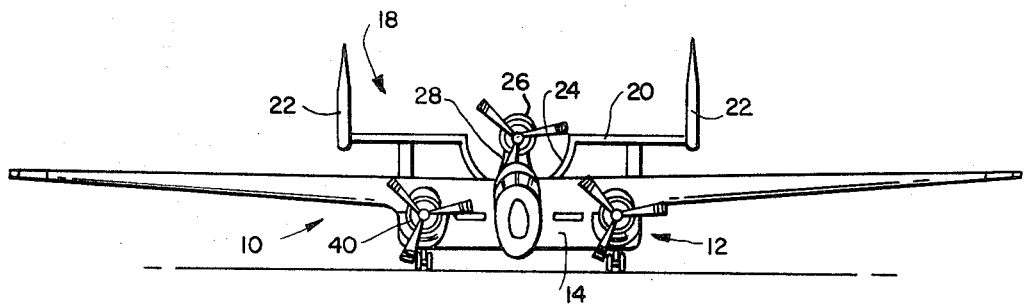
FIG. 3 is a front elevation of the aircraft of FIGS. 1 and 2.
Figure 1:
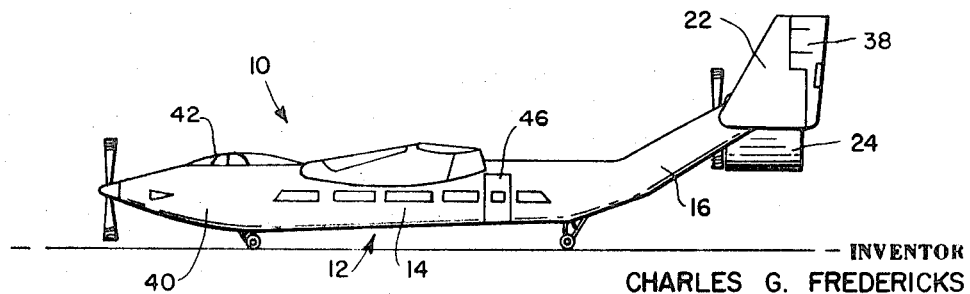
FIG. 1 is a side elevation of the channel tail lifting body aircraft.

With general reference to FIGS. 1, 2 and 3, a short takeoff and landing aircraft is generally referred to by the numeral 10. A fuselage 12 has a main lifting body portion 14 which has a rectangular planform. Twin booms 16, which also form part of the fuselage, extend rearwardly from the main body 14 terminating in a tail section generally represented by the numeral 18. A horizontal fin 20 is connected to the rearward ends of the twin booms 16. Vertical fins 22 are mounted on lateral extremities of the horizontal fin 20. A central channel section 24 is provided in the horizontal stabilizer 20 and the channel section extends downward from the general plane of the horizontal stabilizer, describing a generally semicircular cross section. An engine 26 is mounted centrally within channel 24 on an engine mount 28 which extends upward from the bottom of the channel. Engine 26 is a turbo prop engine, and propeller 30 is located immediately in front of the semicircular leading edge of the channel section 24.

As best shown in FIGS. 1 and 3, the channel section is disposed substantially above the lifting body 14. Consequently, propeller 30 draws air from the upper surface of the lifting body and rushes the air through the channel section. The greatly increased flow of air over the upper surfaces of body 14 and channel 24 increases lift of both those members to a great extent.

Completing the configuration of the aircraft are conventional air foil lifting and control surfaces, propulsion means, accesses and crew facilities. Wings 32 extend laterally from main lifting body 14, and the wings are provided with conventional roll controlling ailerons 34. Elevators 36 are provided in the tail assembly, and rudders 38 are provided in the vertical stabilizers of the tail assembly. Trim tabs are preferably provided on all control surfaces. Twin engines 40 are mounted forwardly of lifting body fuselage 14, and a cockpit 42 is provided between the engines. Nose slats 44 are provided between cockpit and engines to increase air flow over the upper surface of the lifting body.

A passenger and crew access door 46 is provided in the side of the lifting body, and clam-shell cargo doors 48 are provided in the trailing edge of the lifting body. The clam-shell cargo doors open upwardly and downwardly so that large prepacked containers may be moved into and out of the aircraft. Seat assemblies are moved through the clam-shell doors 48 so that the interior of the aircraft may be quickly reconfigured for nighttime cargo service.

What is claimed is:

1. An aircraft comprising a fuselage, wings extending laterally from the fuselage, an empennage mounted rearwardly on the fuselage, the empennage having interconnected vertical stabilizer means and horizontal stabilizer means, the horizontal stabilizer means connected to and located intermediate of the vertical stabilizer means above the fuselage, the horizontal stabilizer means including upward opening downward curving channel means, and propulsion means connected to the aircraft, the propulsion means vertically mounted on the aircraft above the fuselage in the channel means for directing a fluid stream over the fuselage and through the channel means for enhancing lift on the fuselage and the empennage.

2. The apparatus of claim 1 wherein the propulsion means comprises an engine mounted on the aircraft and a propeller connected to the engine, wherein the propeller is juxtaposed to the channel means.

3. The apparatus of claim 2 wherein the engine is mounted in the channel means and wherein the propeller closely approaches the channel means.

4. The apparatus of claim 3 wherein the propeller is mounted on the engine and extends therefrom to a position adjacent a leading edge portion of the channel means.

5. The apparatus of claim 1 wherein the channel means is semicircular in transverse cross section.

6. The apparatus of claim 5 wherein the propulsion means comprises an engine mounted centrally in the channel means along a central axis thereof and wherein the propeller sweeps an arc slightly forward of and parallel to a semicircular leading edge of the channel means.

* * * * *